(12) United States Patent
Hanfland

(10) Patent No.: US 8,702,344 B2
(45) Date of Patent: Apr. 22, 2014

(54) ROAD PAVER WITH LAYER THICKNESS MEASURING DEVICE

(75) Inventor: Dennis Hanfland, Mannheim (DE)

(73) Assignee: Joseph Vogele AG, Ludwigshafen/Rhein (DE)

( * ) Notice: Subject to any disclaimer, the term of this patent is extended or adjusted under 35 U.S.C. 154(b) by 0 days.

(21) Appl. No.: 13/524,517

(22) Filed: Jun. 15, 2012

(65) Prior Publication Data

US 2012/0321385 A1 Dec. 20, 2012

(30) Foreign Application Priority Data

Jun. 15, 2011 (EP) .................................... 11004888

(51) Int. Cl.
*E01C 23/01* (2006.01)

(52) U.S. Cl.
USPC ......................................... 404/84.1; 404/118

(58) Field of Classification Search
USPC ......... 404/84.05, 84.1, 101, 108, 118; 73/146
See application file for complete search history.

(56) References Cited

U.S. PATENT DOCUMENTS

| | | | |
|---|---|---|---|
| 4,571,695 A | 2/1986 | Elton et al. | |
| 5,129,803 A * | 7/1992 | Nomura et al. ................. | 425/62 |
| 5,201,604 A | 4/1993 | Ferguson et al. | |
| 5,588,776 A * | 12/1996 | Swisher .......................... | 404/72 |
| 5,753,808 A * | 5/1998 | Johnson ......................... | 73/146 |
| 5,975,473 A | 11/1999 | Haas et al. | |
| 6,679,106 B1 * | 1/2004 | Sawa et al. .................... | 73/105 |
| 6,729,596 B2 | 5/2004 | Fumado | |
| 7,172,363 B2 | 2/2007 | Olson et al. | |
| 7,581,329 B2 | 9/2009 | Basham | |
| 7,845,878 B1 * | 12/2010 | Godbersen et al. ............. | 404/72 |
| 2003/0000097 A1 | 1/2003 | Docros | |
| 2004/0056170 A1 | 3/2004 | Fumado | |
| 2005/0147467 A1 | 7/2005 | Kieranen et al. | |
| 2008/0263881 A1 | 10/2008 | Basham | |
| 2010/0014916 A1 | 1/2010 | Green | |
| 2012/0321384 A1 * | 12/2012 | Hanfland et al. ................ | 404/72 |
| 2012/0321386 A1 * | 12/2012 | Hanfland et al. .............. | 404/118 |

FOREIGN PATENT DOCUMENTS

| | | |
|---|---|---|
| DE | 10025462 A1 | 12/2001 |
| DE | 10025474 A1 | 12/2001 |
| DE | 19851153 C1 | 9/2009 |
| EP | 0510215 A1 | 10/1992 |
| EP | 510215 B1 | 5/1997 |
| EP | 1403434 A1 | 3/2004 |
| EP | 1403434 B1 | 4/2008 |
| GB | 2448820 A | 10/2008 |

OTHER PUBLICATIONS

European Search Report mailed Dec. 2, 2011, which issued in corresponding EP Application No. 11004889.9.

(Continued)

*Primary Examiner* — Gary Hartmann
(74) *Attorney, Agent, or Firm* — Fish & Richardson P.C.

(57) ABSTRACT

A road paver with a layer thickness measuring device which comprises a plurality of sensors in order to measure a distance to the subgrade or to the road pavement. The layer thickness measuring device is mounted rotatably on the road paver or on its screed, whereby the layer thickness measuring device has an equilibrium position at a stipulated angle to the horizontal that it retains or to which it returns even if the inclination of the road paver or of the screed to the horizontal changes.

17 Claims, 2 Drawing Sheets

(56) References Cited

OTHER PUBLICATIONS

European Search Report mailed Nov. 25, 2011, which issued in corresponding EP Application No. 11004888.1.
European Search Report mailed Dec. 14, 2011, which issued in corresponding EP Application No. 11004887.3.
U.S. Appl. No. 13/524,436, filed Jun. 15, 2012.
U.S. Appl. No. 13/524,744, filed Jun. 15, 2012.
European Search Report mailed Nov. 25, 2011, which issued in corresponding EP Application No. 11004888.
European Search Report mailed Dec. 2, 2011, which issued in corresponding EP Application No. 11004889.
European Search Report mailed Dec. 14, 2011, which issued in corresponding EP Application No. 11004887.

* cited by examiner

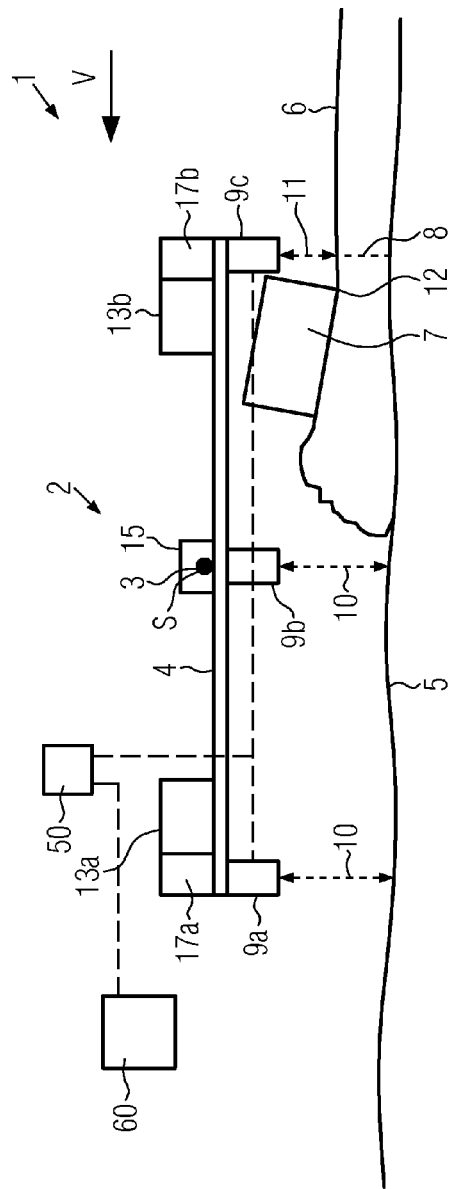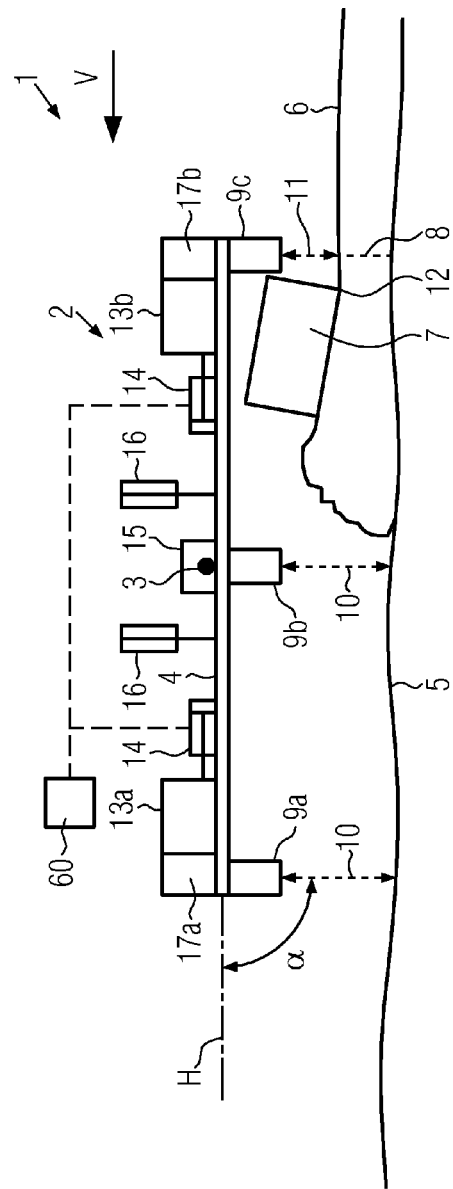

ROAD PAVER WITH LAYER THICKNESS
MEASURING DEVICE

FIELD OF THE INVENTION

The present invention relates to a road paver with a measuring device for determining the thickness of a layer of road pavement and having a screed for laying the road pavement, in which the measuring device comprises a support element and at least two sensors arranged on the support element.

BACKGROUND OF THE INVENTION

During the paving run of a road paver, the layer thickness of the newly laid road pavement should be measured continually and, if possible, in real time. The calculation of the layer thickness and its visualization for an operator should particularly ensure that the road paver guarantees production of a minimum or a maximum layer thickness. This is important because the road laying contractor is bound to provide layer thicknesses agreed to by contract. It should likewise be achieved that the newly laid road pavement can be exposed to different weather conditions without thereby becoming damaged.

Different systems are known in practice for measuring the layer thickness of a newly incorporated road pavement. For example, devices are used that determine the layer thickness by means of ultrasound or radar. The technical disadvantage of such devices is that reflective bodies must be used for an exact layer thickness measurement in order to make it possible to locate the newly laid road pavement unambiguously.

According to another method for measuring the layer thickness of the road pavement, measurement bodies are inserted into the new road pavement until they reach the plane lying underneath. Disadvantageous here is that due to the insertion of the measurement bodies into the new road pavement, damage, such as, for example, unevenness, can remain.

Also known are systems that can, on the basis of a height measurement with respect to the subgrade and on the basis of an inclination measurement of the screed, calculate the thickness of layer that has been laid at a back edge of the screed. In the case of such systems, conventional distance sensors such as, for example, ultrasound or laser sensors, are used for the height measurement. For the inclination measurement of the screed, such systems are equipped with an inclination sensor that is mounted on the screed assemblage. Although it is possible to achieve good measurement results with these systems on some subgrades, layer thickness measurement systems that use an inclination sensor to determine the layer thickness tend, particularly on uneven ground, to deliver poor measurement results. It is also disadvantageous that an inclination sensor used for calculating the layer thickness is extremely sensitive to accelerations or abrupt changes in the inclination of the road paver or the screed, which leads to poor measurement results.

For example, DE 100 25 462 A1 describes a system for determining the layer thickness of a newly laid road pavement by using an inclination sensor. Disclosed therein is a device for determining the layer thickness on the basis of a predetermined distance between the position of a height sensor and the screed back edge, the registered height above the subgrade and a determined tow arm-screed assemblage inclination, which is registered by means of an inclination sensor. As was already indicated, in the case of such a solution the measurement result for the layer thickness greatly depends on the inclination sensor, which can already be irritated by small vibrations or accelerations. Even small errors of the inclination sensor are enough to cause large errors in the calculation of the layer thickness.

DE 100 25 474 A1 describes a device for determining the layer thickness of a laid material to be applied to a subgrade by a road paver, whereby the road paver has a tractor, at least one tow arm mounted rotatably on the tractor in a manner that allows the height to be adjusted, a floating screed rigidly attached to the at least one tow arm that, with the tow arm, forms a tow arm-screed assemblage and an undercarriage lying with its bottom side on the base. The device furthermore comprises a distance sensor attached in a stationary manner to the tractor for measuring a relative distance between a reference position of the tractor and a reference position of the tow arm-screed assemblage, whereby the reference position of the tractor has a predetermined positional relationship to the bottom side of the undercarriage, and the reference position of the tow arm-screed assemblage has a predetermined positional relationship to a lower back edge of the screed.

DE 198 51 153 C1 relates to a method for measuring a driving surface, in which the driving surface profile is registered metrologically. Understood as a driving surface hereby is, in particular, a traffic area, e.g., a street or a highway, that is set up with a number of coats or layers in the framework of highway construction or repair work. The invention furthermore relates to a system for carrying out the method with a mobile testing device.

EP 0 510 215 B1 describes a device for regulating a driving surface cover thickness. The device comprises height sensors and inclination sensors, all of which are arranged on a screed assemblage in such a way that they follow a movement of the screed.

U.S. Pat. No. 7,172,363 B2 refers to a paving machine. The paving machine can have a power source, a traction system, a hopper that is configured to hold paving material, and one or more conveyors that are configured to transfer the paving material from the hopper. The paving machine can also have a plate or a screed board that is configured to lay out a mat of the paving material. The paving machine furthermore comprises at least one front sensor that is mounted on a front part of the paving machine and configured in order to measure the height from a surface to the front sensor, and at least one rear sensor that is mounted on the paving machine and configured in order to measure the height from a surface of the mat to the rear sensor. The paving machine also comprises a controller that is configured to determine a thickness of the mat by determining a difference between one or more front height measurements that have been recorded by at least one front sensor, and one or more rear height measurements that have been recorded by the at least one rear sensor. The sensors are mounted on a support that is permanently connected to the screed.

In light of the obvious technical problems and disadvantages of the state of the art, the object of the present invention is therefore to provide a road paver having a measuring device for determining the layer thickness of a newly incorporated road pavement, whereby the measuring device is not sensitive to accelerations or changes in the inclination of the road paver, and consequently in this way allows an improved measurement result of the layer thickness.

This object is solved with the present invention as described below.

SUMMARY OF THE INVENTION

According to the invention, the road paver comprises a measuring device for determining a layer thickness of a newly laid road pavement, as well as a screed for applying the new road pavement. The measuring device has a support element and at least two sensors that are mounted on the support element. The sensors are formed to measure a distance to the plane, meaning to the subgrade where no road pavement has yet been laid, or to the newly laid road pavement. According to the invention, the measuring device is supported rotatably on the road paver or the screed in such a way that it has an equilibrium position at a stipulated angle to the horizontal that it retains or to which it returns even should the inclination of the road paver or the screed with respect to the horizontal change.

The stipulated angles can thereby, if the measuring device is in the equilibrium position, be defined by a position of different components of the measuring device relative to the horizontal. For example, it would be possible to define the stipulated angle by a position of the support element relative to the horizontal, whereby the stipulated angle would be zero if the support element is aligned with the horizontal in order to keep the measuring device in the equilibrium position.

As an alternative to this, the stipulated angle could also be defined with consideration given to a measuring direction of the sensors relative to the horizontal. In one application, when the measuring direction of the sensors points perpendicularly to a horizontally aligned subgrade, the stipulated angle would correspond to 90 degrees. The stipulated angle, meaning the angle between the horizontal and the measuring direction of the sensors, would correspondingly change when the equilibrium position of the measuring device does not lie in the horizontal.

It is thereby possible to set an equilibrium position of the measuring device in such a way that the measuring device is aligned essentially horizontally to the plane on which the road paver, meaning its towing machine, moves forward. Meant as equilibrium position for the measuring device is that this device does not move together with the road paver or the screed if these change their inclination, or, after such a change in inclination of the road paver or the screed, that it returns within a short time to the equilibrium position, meaning it is consequently largely independent of the movement of the road paver or screed.

Due to the rotatable support of the measuring device, it is consequently possible intentionally to compensate for unevennesses in the subgrade that lead to constant changes in the inclination of the road paver or the screed during the drive, so that the changes in inclination are not taken into consideration in the calculation of the layer thickness.

The measuring device according to the invention is furthermore simple and economical to manufacture and can be supported on the road paver, particularly on a towing machine of the road paver, or on the screed in a simple manner.

The measuring device is preferably rotatably supported around an axis of rotation relative to the road paver or relative to the screed. In this way, while a road paver is driving, the measuring device remains in its equilibrium position or it can return to this position within a short time.

In an especially advantageous embodiment of the invention, the axis of rotation runs through a centre of gravity of the measuring device. This results in the technical advantage that the measuring device is not as easily brought out of its resting position, meaning out of the equilibrium position, due to changes in inclination during the paving run. This is particularly due to the fact that moments that act on the measuring device during the paving run, for example, due to an acceleration of the road paver, are reduced or completely prevented.

In order for it not to be easy to bring the measuring device out of its equilibrium position, the centre of gravity of the measuring device is preferably spaced less than 10 cm from the axis of rotation. In the event of close spacing of this kind between the centre of gravity and the axis of rotation, it is to be assumed that the measuring device will retain a stable equilibrium position during the paving run. This can also have advantages with respect to manufacturing.

In a further embodiment of the invention, the measuring device is formed to be attachable to different positions of the paver or the screed. In this way, it is possible to use the measuring device flexibly, whereby particularly specific characteristics, such as, for example, the measuring capability of the sensors or design features of the support element, can be taken into consideration. Furthermore, in this way the weather situation at the paving location or the temperature above the paving material can be taken into consideration. Finally, the operating personnel have available a plurality of attachment options in this way.

Alternatively, it would be possible that the axis of rotation is spaced at a distance from a centre of gravity of the measuring device. This can ensure that the measuring device remains in the equilibrium position even when the road paver or the screed drives through changes in inclination. By means of a variable distance between the axis of rotation and the centre of gravity, it would also be possible to set an inertia level of the measuring device.

The centre of gravity of the measuring device preferably lies vertically below the axis of rotation when the measuring device is in the equilibrium position. The result of this is that a restoring force acts on the measuring device and returns this to the equilibrium position within a short time when the measuring device has been moved out of this position.

In a special embodiment, the axis of rotation is displaceable relative to the centre of gravity, for example, in the horizontal and/or vertical direction, so that the measuring device has the stipulated angle to the horizontal, meaning a desired slanting position. As an alternative to this, the support element of the measuring device can be arranged movably relative to the axis of rotation so that the measuring device has the stipulated angle to the horizontal. In this way, it is possible that the equilibrium position of the measuring device is adjustable for all driving surface inclinations.

In a further embodiment of the invention, the sensors are arranged and configured on the support element of the measuring device in such a way that at least one of the sensors measures the distance to the plane and at least one of the sensors behind the screed measures the distance to the road pavement. In this way, it is possible in a reliable manner to measure the layer thickness of the new road pavement behind the screed.

The support element preferably comprises a first bar that is arranged on a left or on a right side of the road paver, seen in the driving direction. The bar offers a good basis in order to mount the sensors on it. The bar furthermore represents a suitable means for the measuring device in order to support the measuring device in equilibrium and rotatably in such a way that this retains its stipulated, e.g., essentially horizontal, position relative to the plane even when the road paver accelerates or there are vibrations on a bumpy driving surface.

In a further embodiment of the invention, the support element comprises a second bar that, seen in the driving direction, is arranged on the road paver or on the screed on the other side, meaning opposite the first bar. The presence of the two bars makes it possible for the measuring device to record measured values across a wide area in order to determine the layer thickness.

In an especially stable execution of the measuring device, the two bars are connected to each other rigidly by means of at least a third bar aligned crosswise to the driving direction. The result of this is that all bars are movably synchronously with respect to one another, so that the movement of one bar is coupled to the movement of the others.

According to a further embodiment of the invention, the measuring device comprises an evaluation unit that is formed to evaluate the distance measurements of the sensors in order to determine the layer thickness. Due to the evaluation unit, it is possible to take into consideration all distance measurements of the sensors in such a way that there results a measurement result for the layer thickness that is reliable and suitable for actual use. The evaluation unit can be configured in such a way that it calculates the layer thickness as the result of a difference between the measured distance to the plane and the measured distance to the newly laid layer.

The evaluation unit is preferably connected to an operating device that visually displays the determined layer thickness to an operator or indicates the same by acoustic means. It is also conceivable that the operating device is formed to indicate to the operator by means of visual or acoustic warning signals that the evaluation unit has detected a critical layer thickness, meaning that a minimum or maximum layer thickness has been reached. This offers the technical advantage that an operator, by means of suitable action, can react quickly to such an extreme situation.

A further advantageous execution provides means for the measuring device that are formed to set a torsional rigidity, meaning a resistance to the rotatability of the measuring device. These means would preferably be arranged around the pivot axis. As a result, the measuring device cannot easily be brought out of the equilibrium position, and instead would retain this position even in the event that abrupt accelerations or changes in inclination act on the road paver or screed. This allows a steady support of the measuring device in the equilibrium position, which leads to an improved result in the layer thickness measurement.

The sensors for the distance measurement to the plane or to the surface of the newly laid road pavement are preferably acoustic and/or optic sensors, particularly ultrasound or laser sensors. In this way, contactless distance measurement is possible.

In another execution, the measuring device comprises a servo motor that is configured to support a rotational movement of the measuring device around the axis of rotation, whether for the purpose of moving the measuring device back into its equilibrium position or for the purpose of moving the measuring device into a new equilibrium position according to the driving surface inclination. The servo motor is thereby formed so that it is self-locking, and consequently it counteracts an unwanted rotational movement of the measuring device.

The measuring device preferably comprises at least one ballast element, which is arranged on the measuring device in such a way that the measuring device is located, relative to the plane, in a stable equilibrium position horizontally or at another stipulated angle to the horizontal. As a result of the ballast element, it is possible to balance and set a desired equilibrium position of the measuring device, particularly when the ballast element can be mounted on the measuring device at different positions.

In a further embodiment, a position of the ballast element relative to the support element can be changed manually or automatically in order that the measuring device has the stipulated angle to the horizontal. It is advantageous if the measuring device comprises at least one actuating element in order to displace the ballast element. It would thereby be possible to use hydraulic or pneumatic actuating elements. It could also be that an automatic activation of the actuating elements takes place by means of the operating device in order to regulate the equilibrium position of the measuring device in such a way that it has the stipulated angle relative to the horizontal. In particular, this allows a precise layer thickness measurement during a paving run across alternating rising and falling sections of the driving surface.

In a further embodiment of the invention, the position of the at least one ballast element can be changed manually or automatically, in order to displace the centre of gravity of the measuring device on to the axis of rotation. In this way, it is possible, for example, before a paving run, to adjust the measuring device, particularly the at least one ballast element, in such a way that during the paving run, a reduced number of moments acts on the measuring device. As a result, the measuring device retains a stable equilibrium position during the paving run in spite of inclination changes in the road paver or the screed.

In an especially clever execution of the invention, the measuring device is configured to register whether or not its centre of gravity is located on the axis of rotation. For this purpose, measuring means, for example, can be present that determine a relative distance between the centre of gravity of the measuring device and the axis of rotation. It would thereby be especially advantageous if the at least one ballast element drives automatically into a certain position in order to displace the centre of gravity back onto the axis of rotation when the measuring device registers that the centre of gravity is not located on the axis of rotation. In this way, the assembly or adjustment of the measuring device can be made simpler for the operator, whereby considerable time savings at the installation site must likewise be expected.

For a precise measurement result of the layer thickness, it is advantageous if a plurality of sensors is provided on the measuring device in order to measure the distance to the plane. In this way, it is possible to include a plurality of distance values in the calculation of the layer thickness.

To create a representative distance value it would be expedient to form the measuring device to determine an average value using the plurality of determined distance values to the plane, whereby this average value can be used for calculating the layer thickness.

It is likewise advantageous if the measuring device comprises a plurality of sensors in order to measure the distance to the road pavement. Similarly to the case of the measurement to the plane, in this way it is possible to obtain an overview of the surface condition of the newly laid road pavement in a plurality of locations instead of just in one location.

The measuring device is preferably formed for the purpose of forming an average value by means of the plurality of distance values to the road pavement, whereby this average value representatively represents the distance to the newly laid road pavement. Due to the averaging, the measuring device can manage with less memory.

It would be especially simple to determine the layer thickness if the measuring device were to be formed to calculate the layer thickness on the basis of the two previously mentioned average values. This is absolutely expedient as far as an inclination of the screed crosswise to the direction of travel is negligible.

In a preferred embodiment of the invention, the plurality of sensors for registering the distance to the plane is arranged on the support element in groups. In this way, it is possible to register a plurality of measurement results in places. This leads to an improved result in the distance measurement at a particular place. As an alternative to this, the sensors can be arranged on the support element equidistant to one another. As a result of this, the layer thickness of the road pavement is represented reliably across the complete width. Likewise, meaning in groups or in equidistant spacing from one another, it is possible to arrange the sensors for the distance measurement to the road pavement on the support element.

In order additionally to improve the support of the measuring device on the road paver or on the screed, the measuring device comprises cushioning elements that are formed for the purpose of cushioning accelerations of the road paver or of the screed so that the measuring device remains stable in the stipulated equilibrium position and does not come out of its resting position. The cushioning elements could conceivably be, for example, mechanical or hydraulic shock absorbers, particularly springs or oil shock absorbers.

In an especially advantageous embodiment of the invention, the measuring device comprises at least one stabilizer in order to prevent moments of force from acting on the measuring device even when the road paver accelerates. The at least one stabilizer can be arranged at different places on the measuring device, but preferably on an end of the first or second bar, because the greatest moments are to be expected at these places. The at least one stabilizer is thereby characterised in that its moment of inertia counteracts an acceleration acting on the measuring device in such a way that the measuring device retains its equilibrium position. Especially on a bumpy paving section, the stabilizer consequently ensures a quiet position of the measuring device.

At least one gyro element is preferably provided for the at least one stabilizer. This gyro element can be arranged rotatably on the measuring device around an axis that preferably runs through the centre of gravity of the gyro element. The at least one gyro element comprises an especially favourable geometric body in order to oppose accelerations with an effective moment of inertia. In order to increase the moment of inertia, it would thereby be conceivable to form the gyro element as a hollow body.

It is however also conceivable that the at least one stabilizer comprises, in addition to or instead of the gyro element, at least one other geometric body, for example, at least one cylindrical, ball-shaped, cuboid-shaped, cone-shaped, truncated cone-shaped and/or pyramid-shaped body. In order to achieve a desired moment of inertia, such bodies can also comprise different dimensions or can be formed as hollow or solid bodies.

It is also advantageous that the measuring device is not only capable of being supported in equilibrium relative to a level subgrade, but rather it is also capable of being displaced into an equilibrium position relative to a slope, meaning to an inclined subgrade. The measuring device thereby retains a position during the paving run that is essentially parallel to the inclined subgrade. In this way, it is possible to carry out a reliable layer thickness measurement even on an unusual subgrade, such as, for example, is the case when asphalting or paving a slanted subgrade or slopes or ramps. The ballast elements are preferably arranged on the measuring device in such a way that the centre of gravity of the measuring device is displaced on to the axis of rotation.

To calculate the layer thickness of a newly laid road pavement, the following devices and/or methods can also be used. One of these is a carriage that is movably mounted on the screed and that extends from the screed, through the newly applied mixture and to the plane. A displacement of the carriage relative to the screed is registered by means of a translational sensor in order to obtain a height of the screed relative to the carriage. An angle sensor is furthermore arranged on the carriage in order to register a change in the inclination of the carriage relative to the screed. The combination of the angle sensor and the translational sensor can produce a geometric relationship between the rear edge of the carriage and the rear edge of the screed in such a way that the thickness of the laid layer can be calculated. In order for the carriage to be better movable in the mixture, the carriage can additionally be heated.

The layer thickness can also be determined by mounting a heated hook in front of the screed, possibly to the towing machine of the road paver, whereby the heated hook is formed in such a way that the end of the hook is located in the layer that has been laid both on the plane and below the rear edge of the screed. By means of a sensor mounted on the screed, the end of the hook can be registered below the rear edge of the screed in order to determine the layer thickness.

The layer thickness calculation is also possible by means of a tube water level that preferably comprises three measurement elements pulled one behind the other and also fluidly connected to one another. The two first measurement elements are thereby guided on the plane, while the third, last measurement element is pulled on the surface of the newly laid road pavement. The two front measurement elements represent a reference and are used by the two rear measurement elements, meaning the tube water levels, for determining the thickness as soon as the middle tube water level is located at a point at which the first measurement element was located at a previous time. An inclination sensor can be provided for the tube water level so that changes in the inclination are not neglected in the measurement result. In another variant, it is also possible to calculate the change in the inclination on the basis of the registered height differences of the tube water levels without an inclination sensor, and to take them into consideration in the determination of the thickness.

In order to produce, in a simple manner, an inclination reference for determining the layer thickness, it is also possible to provide the towing machine with two frames connected to each other by means of a pivot joint, whereby the front one of these is in contact with two points of the plane and the rear one is in contact, with the entire joint, with the plane and, with the rear point, with the newly laid layer. Each of the two frames has an inclination sensor. The front frame consequently records a reference that is used for determining the thickness as soon as the rear frame is located at the old position of the front frame. As a substitute, the layer thickness can also be registered by means of an infrared sensor that is arranged on the front frame and that registers a height change of the rear frame that has an articulated connection to the front frame.

In another optional execution for determining the layer thickness, a bridge-like arrangement is arranged above the screed in such a way that a first movable arm is towed on the newly laid street layer along the direction of travel on the plane by means of angle registration and a second movable arm is towed along the driving direction, likewise by means of angle registration. It is likewise possible for a plurality of towing elements, adjustable in the angle, to be pulled behind the screed, by means of which the layer thickness can be registered relative to a reference located on the plane. It is likewise possible to mount the two angled bridges on the screed on a pivot bearing.

BRIEF DESCRIPTION OF THE DRAWINGS

Embodiments of the invention are presented using the drawings described in the following. Shown are:

FIG. 1 a rotatably supported measuring device according to the invention,

FIG. 2 a cushioned measuring device with displaceable ballast elements, and

DETAILED DESCRIPTION OF THE INVENTION

Figure 3:
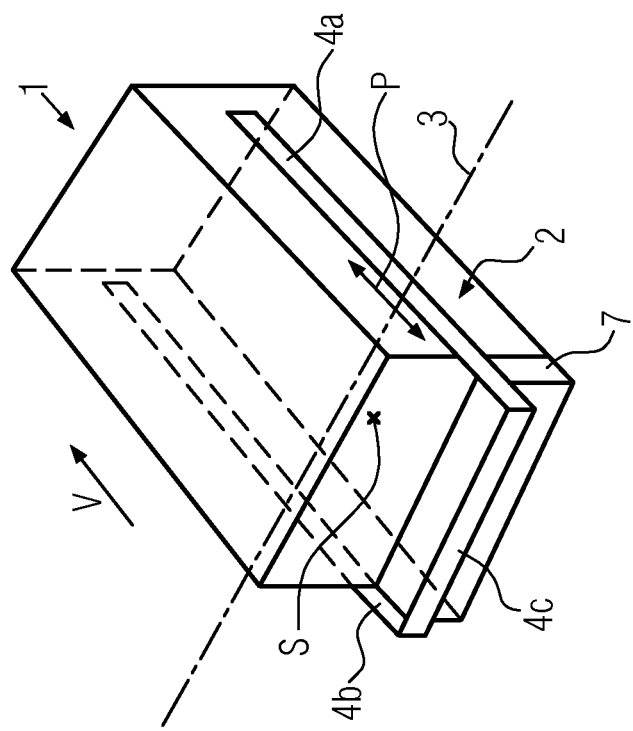
FIG. 3 a schematic depiction of a road paver with mounted measuring device.

FIG. 1 shows a road paver 1 with a measuring device 2, which is rotatably supported on an axis of rotation 3 in such a way that the measuring device 2 takes on an equilibrium position at a stipulated angle to the horizontal. According to the embodiment of FIG. 1, the axis of rotation 3 runs through a centre of gravity S of the measuring device 2. A distance between the axis of rotation 3 and the centre of gravity S, particularly a distance of low dimension, is also conceivable, but is not shown in FIG. 1.

FIG. 1 furthermore shows that the measuring device 2 has a support element 4 that is supported essentially horizontally to the subgrade 5. The road paver 1 moves on the subgrade 5 in the direction of travel V, whereby the road paver 1 applies a road pavement 6 on the subgrade 5 with a screed 7. The screed 7 is supported in such a way that it is movable relative to the road paver 1, so that it is possible to move this by means of a levelling technique, not shown, in such a way that it compensates for a change in the inclination of the road paver in order to produce a flat road pavement surface.

By means of the rotatable equilibrium position of the measuring device 2, the measuring device 2 is decoupled from the movements of the road paver 1 or of the screed 7. As a result it is possible for the measuring device 2 to retain its equilibrium position, meaning essentially horizontally to the subgrade 5, even when the road paver 1 or the screed 7 drives through changes in inclination. It is pointed out here that a slight deflection of the measuring device 2 by a small angle is not harmful for a good measurement result of the layer thickness as long as during the measurement used for the distance, the set angle does not change by more than a predetermined threshold.

FIG. 1 likewise shows that three sensors 9a, 9b, 9c are arranged on the support element 4. The sensors 9a, 9b, 9c are arranged equidistant from one another along a bottom side of the support element 4. The two front sensors 9a, 9b thereby measure a distance 10 existing between the sensors 9a, 9b and the subgrade 5. The third sensor 9c is arranged on the support element 4 in such a way that it determines a distance 11 to the newly laid road pavement 6, or to put it more precisely, to the surface of the same. By appropriate design measures, it is possible to change the support element 4 in such a way that the distance measurement carried out by the third sensor 9c to register the distance 11 can be carried out at a varying distance behind a rear edge 12 of the screed 7, however preferably not at too great a distance in order to keep from unnecessarily extending the measurement time.

Also to be seen in FIG. 1 is that ballast elements 13a, 13b are arranged on an upper side of the support element 4 at an equal distance to the axis of rotation 3. It is thereby possible to arrange the ballast elements 13a, 13b arbitrarily on the support element 4, so that the measuring device 2 takes on a stable equilibrium position parallel to the subgrade 5 during the paving run of the road paver 1. With the ballast elements 13a, 13b, it is also possible to bring the measuring device 2, by means of skilful arrangement, into such an equilibrium position that this itself can be aligned essentially parallel to an inclined subgrade 5.

In addition to the ballast elements, the depicted embodiment of FIG. 1 shows stabilizers 17a, 17b, each of which is arranged on an outer end of the support element. Depending on the application, the stabilizer 17a, 17b can, however, also be arranged at another place of the measuring device 2.

FIG. 1 furthermore shows an evaluation unit 50 that is connected to the sensors 9a, 9b, 9c and that processes the measurement results of these into the layer thickness 8. In order to convey the calculated layer thickness 8 to an operator, an operating device 60 is provided that is connected to the evaluation unit 50. Arranged near the axis of rotation 3 are furthermore means 15 that are configured to set a torsional rigidity in the measuring device 2.

FIG. 2 shows the measuring device 2 additionally with cushioning elements 16 that cushion a movement of the support element 4, but that are not mandatory for the invention. The cushioning elements 16 are arranged equidistant relative to the axis of rotation 3, whereby they can act on the support element 4 at different locations. FIG. 2 furthermore shows actuating elements 14 that are connected to the ballast elements 13a, 13b and to the operating device 60, whereby the actuating elements 14 are formed as piston-cylinder units that can displace the ballast elements 13a, 13b. Finally, a horizontal H is shown in FIG. 2. The horizontal H is deemed to be a reference for determining the stipulated angle in order to hold the measuring device 2 in the desired equilibrium position. Here the stipulated angle $\alpha=90°$ is the angle between the horizontal H and the measurement direction of the sensors 9a, 9b, 9c.

FIG. 3 schematically depicts a road paver 1 with a measuring device 2 thereon that can be rotated around the axis of rotation 3. The support element 4 thereby comprises a first bar 4a, a second bar 4b and a third bar 4c that connects the first and second bars 4a, 4b. The first and second bars 4a, 4b project beyond the screed 7 in order to measure the distance 11 to the newly laid road pavement 6. FIG. 3 furthermore shows the centre of gravity S of the measuring device 2, which here lies below, but is preferably on, the axis of rotation 3. A double-headed arrow P in FIG. 3 represents that the measuring device 2 or the axis of rotation 3 can be displaced, so that the measuring device has an equilibrium position at a stipulated angle. Even if not shown in FIG. 3, it would be possible to use a fourth bar opposite the third bar 4c in order to connect by means of this one the ends of the first and second bars 4a, 4b that are not connected. The bars of the support element 4 would thereby represent a closed frame structure.

The measuring device 2, as it is used in the invention for the road paver 1, can likewise be used for layer thickness measurement on other construction machines that apply layers other than a road pavement onto a subgrade. Conceivable, for example, are construction machines that only apply sand layers or gravel layers.

The invention claimed is:

1. Road paver comprising:
   a measuring device that determines a layer thickness of a road pavement; and
   a screed that lays the road pavement onto a subgrade;
   wherein the measuring device comprises a support element and at least two sensors positioned on the support element, wherein the sensors measure a distance to the subgrade or to the road pavement;
   wherein the measuring device is rotatably supported on the road paver or screed such that the measuring device has an equilibrium position at a stipulated angle with respect to a horizontal direction and
   wherein the measuring device is retained at the equilibrium position or returns to the equilibrium position if the inclination of the road paver or of the screed changes with respect to the horizontal direction.

2. Road paver according to claim 1, wherein the measuring device is supported such that the measuring device can rotate around an axis of rotation.

3. Road paver according to claim 2, wherein the axis of rotation runs through a centre of gravity of the measuring device.

4. Road paver according to claim 2, wherein a centre of gravity of the measuring device lies less than 10 cm from the axis of rotation when the measuring device is in the equilibrium position.

5. Road paver according to claim 2, wherein the measuring device can be attached to the road paver or to the screed at different places.

6. Road paver according to claim 2, wherein the measuring device comprises at least one ballast element.

7. Road paver according to claim 6, wherein a position of the at least one ballast element can be manually or automatically changed so that the centre of gravity of the measuring device is relocated on to the axis of rotation.

8. Road paver according to claim 7, wherein the measuring device comprises at least one actuating element in order to relocate the at least one ballast element.

9. Road paver according to claim 6, wherein the measuring device is configured to register whether or not its centre of gravity lies on the axis of rotation.

10. Road paver according to claim 9, wherein the at least one ballast element automatically moves into a first position to relocate the centre of gravity back on to the axis of rotation when the measuring device registers that the centre of gravity is not located on the axis of rotation.

11. Road paver according to claim 10, wherein the measuring device comprises an apparatus for providing a torsional rigidity, to resist rotation of the measuring device.

12. Road paver according to claim 10, wherein the measuring device comprises at least one stabilizer to reduce accelerations on to the measuring device.

13. Road paver according to claim 12, wherein the at least one stabilizer comprises at least one gyro element.

14. Road paver according to claim 13, wherein the measuring device comprises an evaluation unit formed to evaluate the distance measurements of the sensors to determine the layer thickness.

15. Road paver according to claim 14, wherein the support element comprises a first bar and a second bar, wherein the first bar is arranged, seen in the direction of travel, on a right or left side of the road paver and the second bar is arranged on the other side of the road paver.

16. Road paver according to claim 14, wherein the support element comprises a bar, wherein the bar is arranged, seen in the direction of travel, on a right or left side of the road paver.

17. Road paver according to claim 14, wherein the support element comprises a first bar or a second bar, wherein the first bar is arranged, seen in the direction of travel, on a right or left side of the road paver and the second bar is arranged on the other side of the road paver.

* * * * *